(12) United States Patent  
Liotta et al.

(10) Patent No.: US 8,206,119 B2  
(45) Date of Patent: Jun. 26, 2012

(54) TURBINE COVERPLATE SYSTEMS

(75) Inventors: Gary Charles Liotta, Simpsonville, SC (US); Christopher Sean Bowes, Simpsonville, SC (US); John Wesley Harris, Jr., Taylors, SC (US)

(73) Assignee: General Electric Company, Schenectady, NY (US)

( * ) Notice: Subject to any disclaimer, the term of this patent is extended or adjusted under 35 U.S.C. 154(b) by 606 days.

(21) Appl. No.: 12/366,486

(22) Filed: Feb. 5, 2009

(65) Prior Publication Data

US 2010/0196164 A1    Aug. 5, 2010

(51) Int. Cl.  
*F01D 5/32*    (2006.01)

(52) U.S. Cl. .................................... 416/220 R

(58) Field of Classification Search ................. 416/115, 416/207, 212 R, 219 R, 204 R, 220 R, 244 A; 415/115  
See application file for complete search history.

(56) References Cited

U.S. PATENT DOCUMENTS

| | | | |
|---|---|---|---|
| 3,043,562 A * | 7/1962 | Van Nest et al. | 416/221 |
| 3,300,179 A | 1/1967 | Gooderum | |
| 4,019,833 A * | 4/1977 | Gale | 416/220 R |
| 5,030,063 A * | 7/1991 | Berger | 416/220 R |
| 5,169,289 A * | 12/1992 | Lalanne | 416/220 R |
| 5,257,909 A | 11/1993 | Glynn et al. | |
| 5,277,548 A * | 1/1994 | Klein et al. | 416/193 A |
| 5,388,962 A | 2/1995 | Wygle et al. | |
| 5,800,124 A * | 9/1998 | Zelesky | 416/95 |
| 6,190,131 B1 | 2/2001 | Deallenbach | |
| 6,416,282 B1 * | 7/2002 | Beeck et al. | 416/97 R |
| 6,499,945 B1 | 12/2002 | Lathrop | |
| 7,264,447 B2 * | 9/2007 | Ono et al. | 416/193 A |
| 2008/0008593 A1 * | 1/2008 | Zagar et al. | 416/220 R |

* cited by examiner

*Primary Examiner* — Seungsook Ham  
(74) *Attorney, Agent, or Firm* — Fletcher Yoder, P.C.

(57) ABSTRACT

In one embodiment, a coverplate may be configured to axially overlay a plurality of blade retaining slots within a wheel post of a rotor wheel. The coverplate may include a tab for radially securing the coverplate within a complementary groove of the rotor wheel and an aperture configured to align with a corresponding aperture of the turbine wheel to receive a fastener for axially securing the coverplate to the rotor wheel.

20 Claims, 4 Drawing Sheets

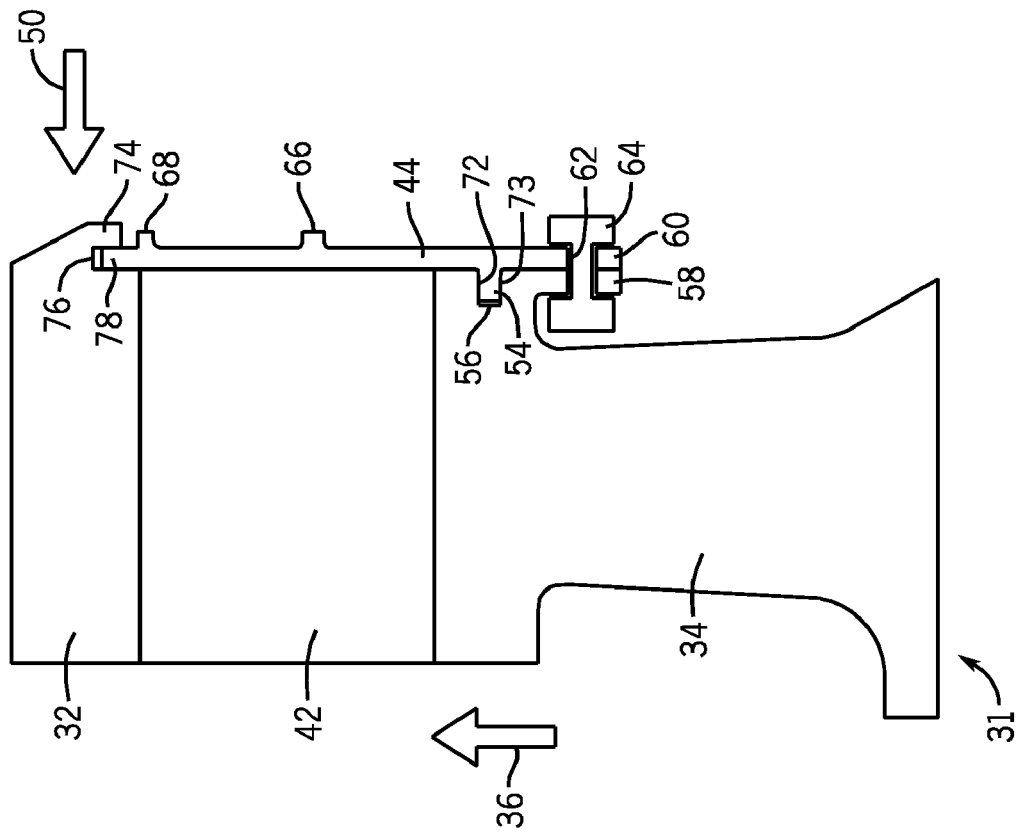
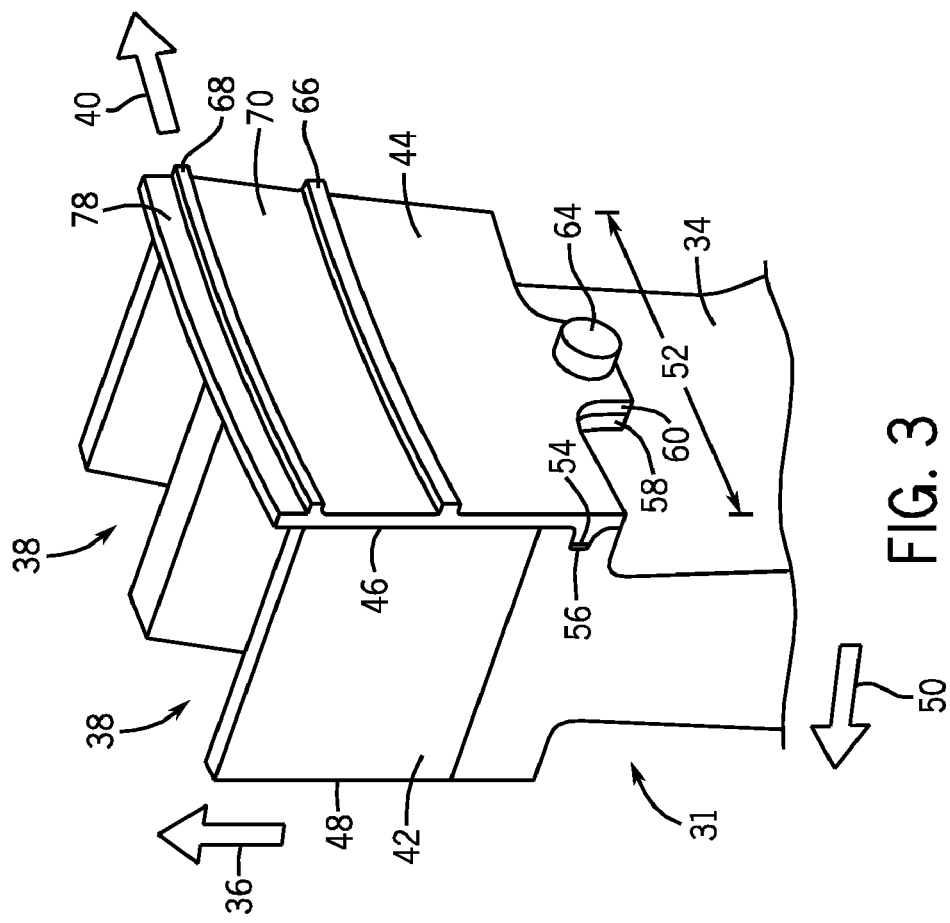

TURBINE COVERPLATE SYSTEMS

BACKGROUND OF THE INVENTION

The subject matter disclosed herein relates to gas turbine engines, and more specifically, to coverplates for turbines.

In general, gas turbine engines combust a mixture of compressed air and fuel to produce hot combustion gases. The combustion gases may flow through one or more turbine stages to generate power for a load and/or a compressor. A pressure drop may occur between stages, which may promote flow of a fluid, such as bucket or blade cooling air, through unintended paths. Coverplates may be disposed over turbine wheel posts to reduce fluid leakage between stages.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a coverplate configured to axially overlay a plurality of blade retaining slots within a wheel post of a rotor wheel. The coverplate includes a tab configured to couple to a complementary groove to radially secure the coverplate to the rotor wheel. The coverplate also includes an aperture configured to align with a corresponding aperture of the rotor wheel to receive a fastener configured to axially secure the coverplate to the rotor wheel.

In a second embodiment, a system includes a coverplate configured to axially overlay a plurality of blade retaining slots within a wheel post of a rotor wheel. The coverplate includes a sealing surface disposed around the perimeter of the coverplate and configured to interface with the wheel post to encircle at least one of the blade retaining slots. The coverplate also includes at least one recess disposed within the sealing surface to reduce the area of the sealing surface that contacts the wheel post.

In a third embodiment, a system includes a rotary machine with a rotor wheel that includes a wheel post with circumferentially spaced blade retaining slots. The rotary machine also includes a plurality of blades disposed within the blade retaining slots to radially extend from the rotor wheel and a plurality of coverplates configured to axially overlay the blade retaining slots. At least one of the plurality of coverplates includes a tab configured to radially secure the coverplate within a complementary groove of the rotor wheel, an aperture configured to align with a corresponding aperture of the turbine wheel to receive a fastener configured to axially secure the coverplate to the rotor wheel, a sealing surface disposed around a perimeter of the coverplate and configured to interface with the wheel post to encircle at least one of the blade retaining slots, and at least one recess disposed within the sealing surface to reduce the area of the sealing surface that contacts the wheel post.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is a perspective view of a portion of the gas turbine engine of FIG. 2 depicting an embodiment of a coverplate attached to a turbine rotor;

FIG. 4 is a detail side view of the rotor of FIG. 3; and

DETAILED DESCRIPTION OF THE INVENTION

Figure 1:
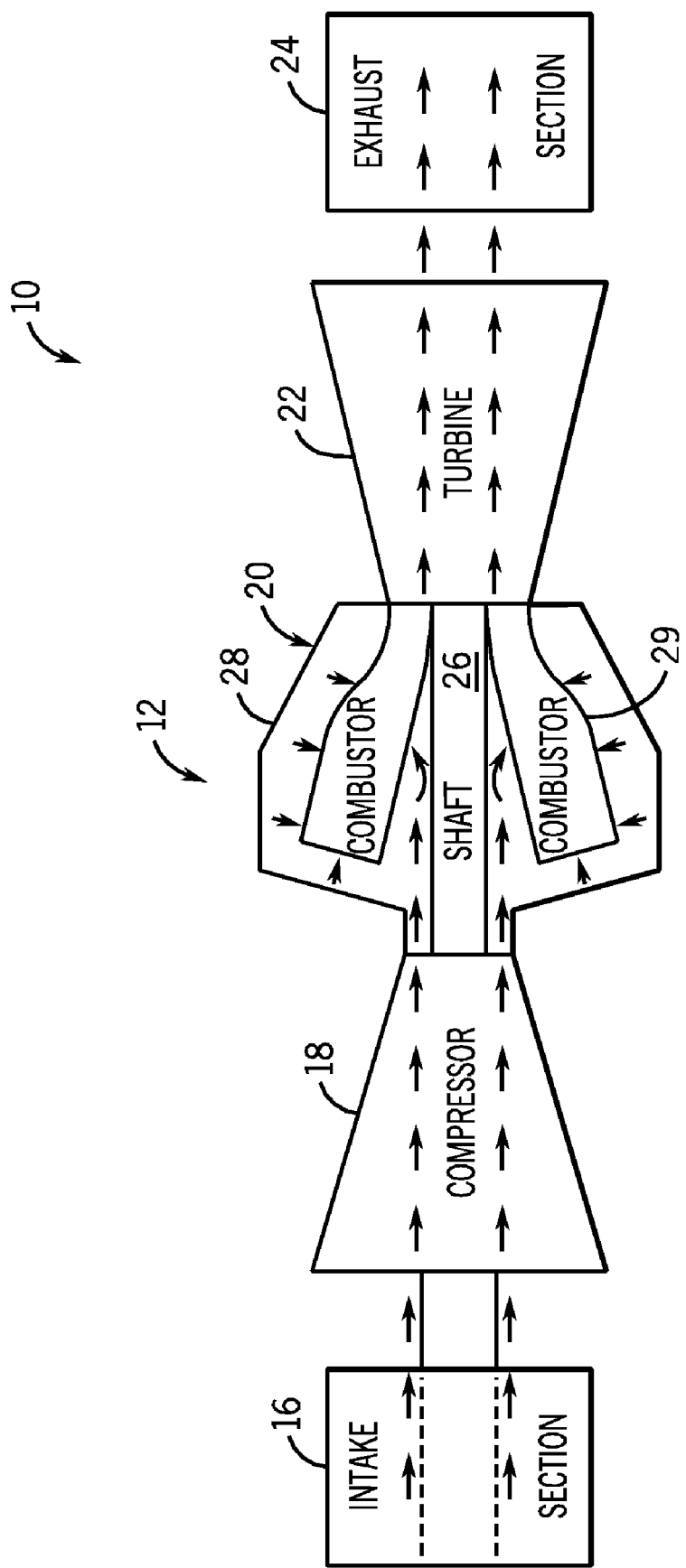
FIG. 1 is a schematic flow diagram of an embodiment of a gas turbine engine that may employ turbine coverplates.

One or more specific embodiments of the present invention will be described below. In an effort to provide a concise description of these embodiments, not all features of an actual implementation may be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to turbines that include segmented coverplates with cross sections designed to transfer a radial load from the coverplate into the rotor wheels to enhance sealing. The coverplates may be disposed across two or more wheel post openings to reduce the leakage of a fluid, such as turbine blade cooling air, through the wheel posts and/or to reduce the leakage of the fluid into the wheel space cavities. The coverplates include raised sealing surfaces that interface with the wheel posts. The sealing surfaces may have a relatively small area in order to provide increased sealing force against the wheel posts. Ribs may be disposed on a surface opposite to the sealing surface to extend outward away from the wheel posts. The ribs may produce torque during operation, thereby forcing the coverplate towards the wheel to enhance sealing.

The coverplates are segmented to span one or more wheel post openings, instead of a 360 degree coverplate that spans all of the wheel post openings within a single rotor wheel. The segmented design may allow field replacement of a coverplate without disassembly of the rotor wheel. The segmented design also may allow the coverplates to be constructed of materials capable of withstanding higher temperatures since the segmented coverplates may be exposed to lower tangential stresses than those applied to the 360-degree coverplates. In certain embodiments, the higher temperature materials may act as a heat shield to shield the rotor wheel from the relatively hot wheelspace temperatures. The coverplates may be affixed to the wheel posts by aligning a tab on the coverplates with a corresponding groove on the wheel posts and by inserting a fastener through corresponding apertures on the coverplates and wheel posts. The tab may transfer loads into the wheel to alleviate stress on the fastener during operation. In certain embodiments, a protruding portion of the coverplates may be inserted within a groove of the turbine blades to provide further axial retention for the coverplate, or axial retention for the turbine blade.

FIG. 1 is a block diagram of an exemplary system 10 including a gas turbine engine 12 that may employ segmented coverplates with enhanced sealing features. In certain embodiments, the system 10 may include an aircraft, a watercraft, a locomotive, a power generation system, or combinations thereof. The illustrated gas turbine engine 12 includes an air intake section 16, a compressor 18, a combustor section 20, a turbine 22, and an exhaust section 24. The turbine 22 is drivingly coupled to the compressor 18 via a shaft 26.

As indicated by the arrows, air may enter the gas turbine engine 12 through the intake section 16 and flow into the compressor 18, which compresses the air prior to entry into the combustor section 20. The illustrated combustor section 20 includes a combustor housing 28 disposed concentrically or annularly about the shaft 26 between the compressor 18 and the turbine 22. The compressed air from the compressor 18 enters combustors 29 where the compressed air may mix and combust with fuel within the combustors 29 to drive the turbine 22.

From the combustor section 20, the hot combustion gases flow through the turbine 22, driving the compressor 18 via the shaft 26. For example, the combustion gases may apply motive forces to turbine rotor blades within the turbine 22 to rotate the shaft 26. After flowing through the turbine 22, the hot combustion gases may exit the gas turbine engine 12 through the exhaust section 24.

Figure 2:
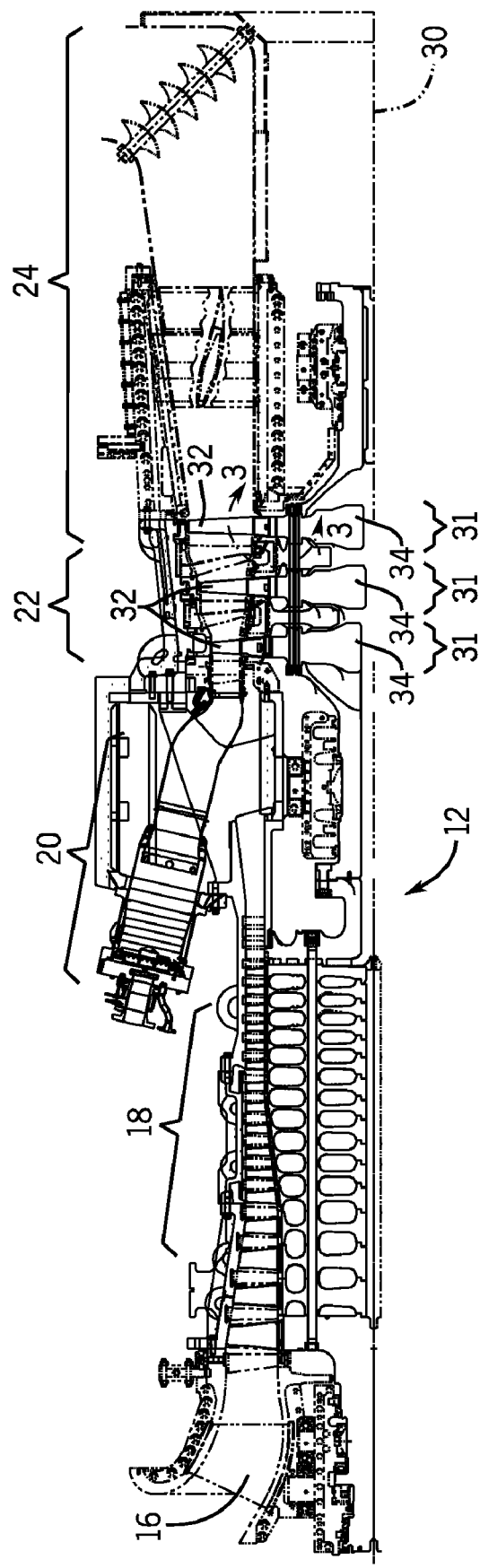
FIG. 2 is a sectional view of the gas turbine engine of FIG. 1 sectioned through the longitudinal axis.

FIG. 2 is a side view of an embodiment of the gas turbine engine 12 of FIG. 1 taken along the longitudinal axis 30. As depicted, the gas turbine 22 includes three separate turbine rotors 31. Each rotor 31 may generally represent a stage within the turbine 22. Each rotor 31 may include a set of blades 32 coupled to a rotor wheel 34 that may be rotatably attached to the shaft 26 (FIG. 1). The blades 32 may extend radially outward from wheel posts disposed around the perimeter of the rotor wheels 34. The blades 32 may be partially disposed within the path of the hot combustion gases. Coverplates may be disposed over the wheel posts to prevent the leakage of turbine blade cooling air through the wheel posts and/or into the spaces between the rotor wheels 34. In certain embodiments, reduction of cooling air leakage may improve turbine efficiency. The coverplates may also act as a heat shield for the rotor wheel and the wheel post. Although the gas turbine 22 is illustrated as a three-stage turbine with three rotors 31, the coverplates described herein may be employed in any suitable type of turbine with any number of stages and shafts. For example, the coverplates may be included in a single stage gas turbine, in a dual turbine system that includes a low-pressure turbine and a high-pressure turbine, or in a steam turbine. Further, the coverplates described herein may also be employed in a rotary compressor, such as the compressor 18 illustrated in FIG. 1.

As described above with respect to FIG. 1, air may enter through the air intake section 16 and be compressed by the compressor 18. The compressed air from the compressor 18 may then be directed into the combustor section 20 where the compressed air may be mixed with fuel gas. The mixture of compressed air and fuel gas is generally burned within the combustor section 20 to generate high-temperature, high-pressure combustion gases, which may be used to generate torque within the turbine 22. Specifically, the combustion gases may apply motive forces to the blades to turn the wheels 34. In certain embodiments, a pressure drop may occur at each stage of the turbine, which may promote airflow through unintended paths. For example, turbine blade cooling air may flow into the cavities between the turbine wheels 34, which may place thermal stresses on the turbine components. In certain embodiments, the interstage volume may be cooled by discharge air bled from the compressor. However, flow of hot combustion gases into the interstage cavities may abate the cooling effects. Further, bucket cooling air, blade cooling air, and/or wheelspace purge flow may leak between the wheel posts, which may reduce the efficiency of the gas turbine engine 12. Accordingly, the coverplates may be disposed over the wheel posts to reduce the leakage of turbine blade cooling air into the interstage cavities and to protect the turbine from the relatively high temperature cavity air.

FIG. 3 is a perspective view of a portion of one of the rotors 31 shown in FIG. 2. For illustrative purposes, only a portion of the rotor 31 is illustrated. However, each rotor 31 may generally include a circular wheel 34 with blades 32 (FIG. 2) extending radially outward (arrow 36) from the wheels 34. For clarity, the blades 32 are not shown in FIG. 3. However, the blades 32 (FIG. 2) may generally be inserted into and extend from openings or blade retaining slots 38 spaced circumferentially (arrow 40) around the wheel 34. In certain embodiments, approximately 60 to 92 blades may be mounted and spaced circumferentially around (arrow 40) the wheels 34 and a corresponding axis of rotation (not shown).

The blade retaining slots 38 are disposed in an upper portion of the turbine wheel 34, generally referred to as the wheel post 42. In certain embodiments, the blade retaining slots 38 may include dovetails designed to interface with complementary dovetails on the ends of the blades 32 (FIG. 2). The wheel posts 42 may generally hold the blades 32 within the wheel 34. When the blades are inserted within the slots 38, gaps may exist at interfaces between the wheel post 42 and the blades 32. In certain embodiments, bucket or blade cooling air or wheelspace purge flow may leak through these gaps. Accordingly, a coverplate 44 is attached to a first surface 46 of the wheel post 42. In certain embodiments, a similar style coverplate may be attached to an opposite surface 48 of the wheel post 42.

The coverplate 44 axially overlays (direction indicated by arrow 50) the blade retaining slots 38 within the wheel post 36. A series of coverplates 44 may be circumferentially placed together, in the direction indicated by arrow 40, to overlay each of the blade retaining slots 38 circumferentially spaced about the wheel post 42. The series of adjacent coverplates 44 may make up an annular shape.

As shown in FIG. 3, the coverplate 44 spans and encircles two adjacent blade retaining slots 38 within the wheel post 42. However, in other embodiments, the coverplates 44 may have a larger or smaller circumferential length 52 to overlay any number of blade retaining slots 38 using a single coverplate 44. For example, an individual coverplate 44 may overlay approximately 1 to 100 blade retaining slots 38, and all subranges therebetween. More specifically, an individual coverplate 44 may overlay approximately 2 to 30 blade retaining slots 38, or even more specifically, approximately 2 to 5 blade retaining slots 38. Moreover, in certain embodiments, the coverplates 44 may include additional features such as angel wings, and other balance and support features, such as balance ribs.

The coverplate 44 may be affixed to the wheel 34 by a tab 54 that fits within a corresponding groove 56 of the turbine wheel 34. In certain embodiments, the tab 54 may extend partially or entirely along the circumferential length 52 of the coverplate 44. In embodiments where the tab 54 extends entirely along the circumferential length 52, the tabs 54 of adjacent coverplates 44 may combine to form an annular shape. The tab 54 and groove 56 may be coupled together to radially secure (direction 36) the coverplate 44 to the wheel post 34. In other embodiments, the positions of the tab 54 and the groove 56 may be reversed. Specifically, a tab may be disposed on the rotor wheel 34 that is configured to fit within a groove of the coverplate 44.

A flange 58 extends from the rotor wheel 34 and mates with a corresponding flange 60 of the coverplate 44. The flange 60 may extend from a lower periphery of the coverplate 44 and may have a scalloped shape. However, in other embodiments, the shape and size of the flange 60 may vary. Each flange 58 and 60 may include a corresponding aperture 62 (shown in FIG. 4) that receives a fastener, such as a bolt 64, to axially secure (in the direction indicated by arrow 50) the coverplate 44 to the wheel 34. The bolt 64 may include a single non-integral fastener for securing the coverplate 44 to the wheel 34. In certain embodiments, the bolt 64 may be replaced by other types of fasteners such as pins, clips, and the like that are bolted, welded or otherwise attached to the wheel 34. The fastener 64 may be removed while in the field to allow replacement of a coverplate 44, and in certain embodiments, the coverplate 44 may be replaced without disassembly of the turbine wheel 34. In certain embodiments, the bolt 64 may be the only non-integral fastener used to affix the coverplate 44 to the rotor wheel 34.

During operation, centrifugal forces (direction 40) may direct the coverplate 44 axially (direction 50) toward the wheel 34 to enhance the sealing. Specifically, the coverplate 44 may include circumferential ribs 66 and 68 that extend from an outward surface 70 of the coverplate 44. The ribs 66 and 68 may create torque during operation, which in certain embodiments may provide an overturning moment, to enhance sealing of the coverplate 44 to the wheel 34. In certain embodiments, the ribs 66 and 68 may function to direct the coverplate 44 toward the rotor 31 during operation of the rotor 31. The ribs 66 and 68 may extend parallel to each other across the circumferential length 52 of the coverplate 44. However, in other embodiments, the ribs 66 and 68 may extend along a different portion of the coverplate 44. Further, any number of ribs of varying shapes, sizes, and lengths may be provided.

FIG. 4 is a side view of the rotor 31 shown in FIG. 3. The coverplate is affixed to the wheel 34 by the bolt 64 that extends through the aperture 62. As described above with respect to FIG. 3, aperture 62 may be formed by aligning corresponding apertures on the coverplate flange 60 and the rotor wheel flange 58. According to certain embodiments, the bolt 64 may have a smaller diameter than the aperture 62 to impede contact between the bolt 64 and the edges of aperture 62 during operation, thereby reducing loads on the bolt 64. The joint formed by the tab 54 and the groove 56 may substantially impede or prevent the coverplate 44 from rotating about the bolt 64. The joint formed by the tab 54 and the groove 56 also may direct radial loads (direction 36) into the turbine wheel 34, thereby alleviating stress on the bolt 64. In certain embodiments, tight tolerances may exist on the upper radial portion 72 of the groove 56. Further, in other embodiments, the tolerances between the tab 54 and the groove 56 may vary. For example, in certain embodiments, a gap may exist between the tab 54 and a bottom portion 73 of the groove 56 to facilitate assembly.

The coverplate 44 also may include axial (direction 50) retention features. For example, the blade 32 may include a flange 74 that extends outwardly from the blade 32 to form a groove 76 that may receive a protruding portion 78 of the coverplate 44. The complementary groove 76 and protrusion 78 may join to axially retain (direction 50) the coverplate 44 during operation of the rotor wheel 34. However, in certain embodiments, the protruding portion 78 may be omitted. Further, in other embodiments, the relative positions of the groove 76 and the protrusion 78 may be switched. Specifically, the coverplate 44 may include a groove for retaining a protrusion that extends from one of the blades 32.

Figure 5:
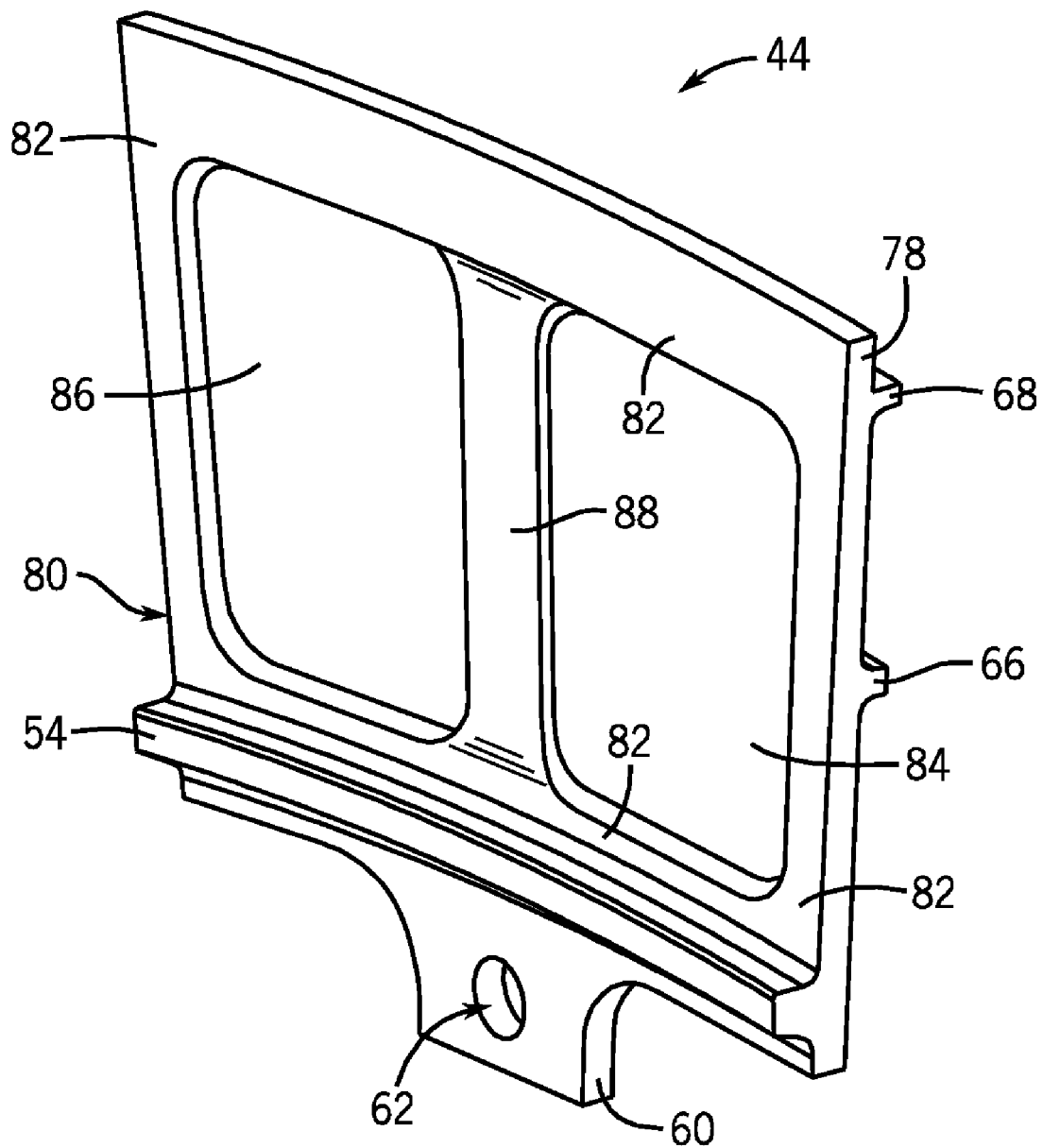
FIG. 5 is a perspective view of the coverplate of FIG. 3 depicting the sealing surface.

FIG. 5 is a perspective view illustrating a sealing surface 80 of the coverplate 44. The sealing surface 80 may be disposed against the wheel post 42 (FIG. 4) and includes a raised section 82 extending around the perimeter of the coverplate 44. Specifically, the raised portion 82 extends circumferentially from just above the tab 54 to protrusion 78. A pair of recesses 84 and 86 may be disposed within the sealing surface 80. The recesses 84 and 86 may generally have a shallower depth than the raised portion 82 to reduce the area of the sealing surface 80 that contacts the wheel post 42 (FIG. 4). The recesses 84 and 86 further may reduce the weight of the coverplate, thereby reducing the centrifugal load the coverplate imparts into the turbine wheel. The reduced area of the sealing surface 80 may allow the centrifugal force to be concentrated toward the wheel 34 over a relatively small area to enhance the sealing. Specifically, only the raised sections 82 of the coverplate 44 may contact the wheel post 42. In certain embodiments, only approximately 10, 20, 30, 40, 50, or 60 percent of the sealing surface 80 may contact the wheel post 42. A support bar 88 may separate the recesses 84 and 86. The support bar 88 may be recessed with respect to the raised section 82, but may not be as recessed as the recesses 84 and 86. In certain embodiments, the support bar 88 may be omitted.

The coverplates 44 illustrated herein may include additional features and/or modifications. For example, additional features, such as angel wings and balance ribs may be included. In another example, the sizes and shapes of apertures 62 may vary. In certain embodiments, the flange 60 may extend across the entire circumferential length 52 (FIG. 3) of the coverplate 44. Further, any number of recesses 84 and 86 may be included. In certain embodiments, each recess 84 or 86 may generally align with a blade retaining slot 38 (FIG. 3). For example, a coverplate 44 designed to cover three blade retaining slots 38 may include generally three recesses 84 or 86. However, in other embodiments, each recess 84 or 86 may overlay multiple blade retaining slots 38.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
 a coverplate configured to axially overlay a plurality of blade retaining slots within a wheel post of a rotor wheel, the coverplate comprising:
  a tab configured to couple to a complementary groove to radially secure the coverplate to the rotor wheel;
  an aperture configured to align with a corresponding aperture of the rotor wheel to receive a fastener configured to axially secure the coverplate to the rotor wheel;
  a sealing surface configured to be disposed against the wheel post;

a raised sealing section disposed on the sealing surface, wherein the raised sealing section encircles a perimeter of the coverplate and is configured to interface with the wheel post to entirely encircle at least one of the blade retaining slots; and a protrusion configured to axially retain the coverplate within a complementary groove of a blade extending from the wheel post.

2. The system of claim 1, wherein the aperture is disposed on a peripheral flange of the coverplate, and wherein the peripheral flange is configured to overlay a corresponding flange of the rotor wheel.

3. The system of claim 1, wherein the tab extends from the sealing surface of the coverplate.

4. The system of claim 3, wherein the coverplate comprises one or more ribs disposed on a surface opposite to the sealing surface and configured to direct the coverplate toward the rotor wheel during operation of the rotor wheel.

5. The system of claim 1, wherein the coverplate is configured to be affixed to the rotor wheel with a single non-integral fastener.

6. The system of claim 1, comprising a gas turbine engine, a compressor, a gas turbine, a combustor, or combinations thereof.

7. A system, comprising:
a coverplate configured to axially overlay a plurality of blade retaining slots within a wheel post of a rotor wheel, the coverplate comprising:
a sealing surface configured to be disposed against the wheel post;
a raised sealing section disposed on the sealing surface, wherein the raised sealing section encircles a perimeter of the coverplate and is configured to interface with the wheel post to entirely encircle at least one of the blade retaining slots; and
at least one recess disposed within the sealing surface to reduce the area of the sealing surface that contacts the wheel post.

8. The system of claim 7, wherein the coverplate comprises a plurality of recesses disposed in the sealing surface and each configured to overlay one of the plurality of blade retaining slots.

9. The system of claim 7, comprising a second recess separated from the at least one recess by a support bar, wherein the at least one recess and the second recess are each configured to align with a separate blade retaining slot of the plurality of blade retaining slots, wherein the raised sealing surface is configured to encircle the first recess and the second recess, and wherein the support bar is recessed with respect to the raised sealing surface.

10. The system of claim 7, wherein the raised sealing surface is configured to encircle at least two blade retaining slots.

11. A system comprising:
a rotary machine comprising:
a rotor wheel comprising a wheel post with circumferentially spaced blade retaining slots;
a plurality of blades disposed within the blade retaining slots to radially extend from the rotor wheel; and
a plurality of coverplates configured to axially overlay the blade retaining slots, wherein at least one of the plurality of coverplates comprises:
a tab configured to radially secure the coverplate within a complementary groove of the rotor wheel;
an aperture configured to align with a corresponding aperture of the rotor wheel to receive a fastener configured to axially secure the coverplate to the rotor wheel;
a sealing surface configured to be disposed against the wheel post;
a raised sealing section disposed on the sealing surface, wherein the raised sealing section encircles a perimeter of the coverplate and is configured to interface with the wheel post to entirely encircle at least one of the blade retaining slots; and
at least one recess disposed within the sealing surface to reduce the area of the sealing surface that contacts the wheel post.

12. The system of claim 11, wherein the rotary machine comprises a gas turbine engine or a compressor.

13. The system of claim 11, wherein the plurality of coverplates comprises a series of circumferentially adjacent coverplates each disposed over at least two blade retaining slots and wherein the at least one coverplate comprises a first recess and a second recess disposed in the sealing surface, separated from one another by a support bar, and encircled by the raised sealing section, and wherein the support bar is recessed with respect to the raised sealing surface.

14. The system of claim 11, wherein the plurality of coverplates are disposed perpendicular to the plurality of blades.

15. The system of claim 11, wherein the at least one coverplate comprises at least two parallel ribs disposed on a surface opposite to the sealing surface and configured to direct the coverplate toward the rotor wheel during operation of the rotor wheel.

16. The system of claim 11, comprising a bolt fastened through the aperture of the coverplate and the corresponding aperture of the rotor wheel.

17. The system of claim 11, wherein the at least one of the plurality of coverplates comprises a protrusion configured to axially retain the coverplate within a complementary groove of a blade of the plurality of blades, wherein the blade extends from one of the encircled blade retaining slots, and wherein the aperture is disposed within a flange of the coverplate extending in a direction opposite to the protrusion.

18. The system of claim 11, comprising a gas turbine engine, a compressor, a gas turbine, a combustor, or combinations thereof.

19. The system of claim 17, wherein the blade comprises a flange that extends outwardly from the blade to form the complementary groove.

20. The system of claim 1, wherein the coverplate comprises a first recess and a second recess disposed in the sealing surface, separated from one another by a support bar, and encircled by the raised sealing section, and wherein the support bar is recessed with respect to the raised sealing surface.

* * * * *